Feb. 21, 1967   J. WIGINGTON   3,305,716
SPEED CONTROL CIRCUITS FOR SERIES MOTORS
Filed July 30, 1964

WITNESS

INVENTOR.
JERRY WIGINGTON
BY
ATTORNEY 3,305,716
SPEED CONTROL CIRCUITS FOR SERIES MOTORS
Jerry Wigington, Pickens, S.C., assignor to The Singer Company, New York, N.Y., a corporation of New Jersey
Filed July 30, 1964, Ser. No. 386,367
2 Claims. (Cl. 318—246)

This invention relates to circuits for controlling the speed of series commutator motors and more particularly to circuits employing semiconductor controlled rectifiers for controlling the power current to said motors responsively to the feedback speed voltage generated by the armature and applied to the firing circuits of said rectifiers.

It has been found that, due to manufacturing tolerances, the residual field flux may vary from motor to motor of the same design and that therefore this flux, alone, cannot be depended upon to produce an armature speed voltage which is a consistent measure of the motor speed. This condition requires circuit compensation to secure uniform response characteristics and is therefore undesirable.

Efforts have previously been made to correct this condition by providing controlled excitation of the series field winding in various ways independently of the residual flux as disclosed in the copending patent applications Serial No. 353,102, filed March 19, 1964, and Serial No. 385,866, filed July 29, 1964, and assigned to the same assignee as the present invention.

According to this invention, novel circuit means are provided to obtain a controlled but constant excitation of the series field winding during time when the controlled rectifier is in its blocking state. This produces an armature speed feedback signal which has essentially a constant D.C. level for a given speed and which signal is combined with an adjustable reference voltage having a positive sloping time function to produce the gate firing voltage.

It is therefore an object of this invention to provide novel circuit means for establishing during certain times a controlled constant excitation of the field winding independently of the residual flux in a series commutator motor fed from an A.C. supply through a controlled rectifier.

It is a further object of this invention to provide novel circuit means for controlling the speed of series commutator motors fed from half-wave controlled rectifiers and having particularly good immunity from the adverse effects of variations in the source voltage.

With the above and other objects in view, as will hereinafter appear, the invention comprises the devices, combinations and arrangements of parts hereinafter set forth and illustrated in the accompanying drawings of a preferred embodiment of the invention from which the several features of the invention and the advantages attained thereby will be readily understood by those skilled in the art.

Figure 1:
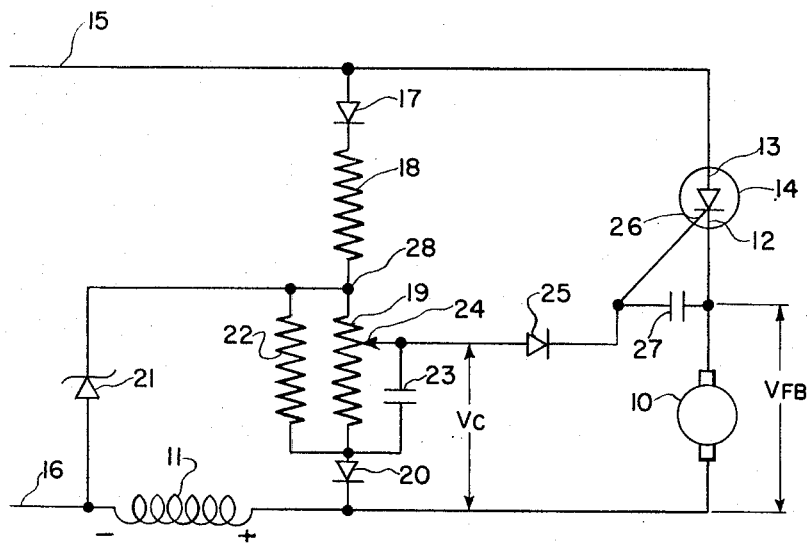

In the drawings, FIG. 1 is a circuit diagram illustrating an embodiment of the invention.

Figure 2:
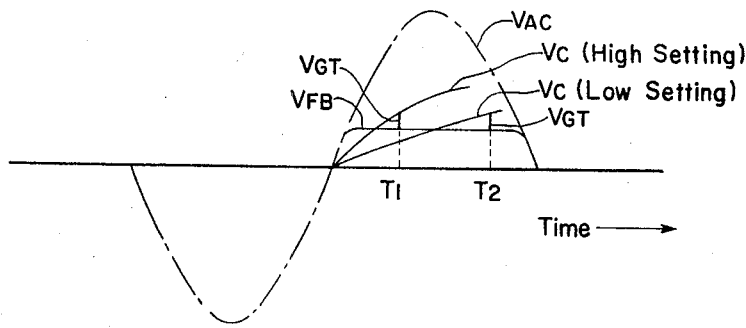

FIG. 2 is a diagram illustrating the time function shapes of certain voltages indicated in FIG. 1.

Referring to FIG. 1, a series commutator motor has an armature winding 10 and a field winding 11 connected in series with cathode 12 and anode 13 of a semiconductor controlled rectifier 14, said series circuit being connected to leads 15 and 16 which are adapted to be connected to a source of alternating current (not shown).

Also connected in series circuit with the leads 15 and 16 is a first diode 17, a fixed resistor 18, a potentiometer resistance 19, a second diode 20 and the field winding 11. A Zener diode 21 connects from the top of potentiometer 19 to lead 16. A second fixed resistor 22 is connected in shunt with the potentiometer 19. A capacitor 23 connects from a slider 24 on potentiometer 19 to the bottom end of said potentiometer. A third diode 25 is connected between the slider 24 and gate 26 of the controlled rectifier 14. A second capacitor 27 may be connected between the gate 26 and the cathode 12 to render the gate less sensitive to commutator transients as is well known.

It will be seen that, during each half cycle of the source A.C. voltage, VAC, when lead 15 is positive, current flows through diode 17, resistor 18, potentiometer 19 (shunted by resistor 22), diode 20 and field winding 11 to lead 16. The Zener diode 21 holds the voltage at point 28 with respect to lead 16 to a positive D.C. level. This D.C. level is established early in the half cycle because the Zener voltage is chosen to be of the order of one-fifth of the R.M.S. value of the source voltage applied to leads 15 and 16. Since the controlled rectifier reverts to its blocking state during each negative half cycle, the effect of the above circuit on the field winding 11 is to provide a constant D.C. excitation current therefor of a value controlled by the Zener voltage and the combined shunt resistance of resistors 22 and 19 and in the same direction as the residual field. The resistance of the field winding itself will ordinarily be too small to be a controlling factor in view of the much larger values of resistance of elements 22 and 19.

It is to be understood that the field flux produced by this controlled current excitation is desirably several times that produced by the residual flux alone, so that any variations of the residual flux from motor to motor of the same design are effectively swamped by the larger controlled excitation thus produced. The resulting armature feedback speed voltage, VFB, as shown in FIG. 2, is thus substantially independent of the residual field flux and is one of the objects of this invention.

It will be seen from FIG. 1 that the reference or control voltage, Vc, is essentially the voltage appearing across the capacitor 23. This voltage is obtained by charging the capacitor 23 from the Zener voltage in each positive half cycle of source voltage through an adjustable portion of the potentiometer resistance 19 controlled by positioning the slider 24. As seen in FIG. 2, where VAC indicates the source A.C. voltage, when the slider 24 is positioned near the top of potentiometer 19, corresponding to a high speed setting, the RC value is small and the capacitor 23 charges rapidly toward the Zener voltage. This produces a fast rising slope for Vc and the gate firing voltage VGT is thus reached early in the cycle resulting in the firing of the controlled rectifier 14 at time $T_1$.

When the slider 24 is positioned near the bottom of potentiometer 19, corresponding to a low speed setting, the RC value is larger and the capacitor 23 charges slowly toward the Zener voltage. This produces a smaller slope for Vc and the gate firing voltage VGT is reached late in the cycle resulting in the firing of the controlled rectifier 14 at time $T_2$.

The resistor 22 permits an adjustment of the field current somewhat independently of the potentiometer resistance 19, which latter is essentially determined by the requirements of shaping the control voltage Vc.

The diode 20 isolates the control components 19, 21, 22 and 23 from the relatively high voltage appearing across the field winding 11 during periods when the controlled rectifier 14 is conducting. Particularly it prevents this field voltage from effecting a variable initial charge on capacitor 23 which would upset the desirable shape of the control voltage, Vc. The field voltage drop during conduction of rectifier 14 has the polarity indicated in FIG. 1 and may be larger than the Zener voltage of Zener diode 21. The diode 20 is thus reversely biased and blocks the flow of current from this source, thus providing the isolation described above.

The fact that, in the circuit of this invention, the armature feedback speed voltage, VFB, and the control voltage, Vc, are both derived from a Zener voltage which is substantially fixed regardless of ordinary fluctuations in the source A.C. voltage makes this circuit outstanding outstanding from the standpoint of inherent stability.

It will be apparent from the above that there has been provided according to this invention a circuit for controlling the speed of series commutator motors fed from an A.C. source which is relatively immune to adverse effects ordinarily caused by variations in residual flux and in the source voltage.

Having thus described the nature of the invention, what I claim herein is:

1. A motor control system comprising:
   (a) a series commutator motor having an armature winding and a field winding,
   (b) a pair of leads adapted for connection to an alternating current source,
   (c) a solid state controlled rectifier having an anode, a cathode and a gate, said anode and cathode being connected in series circuit relation with said armature and field windings between said leads for rectifying alternating current from said source for variably energizing said armature and field windings,
   (d) a first resistor and a Zener diode connected in series across said leads to establish a D.C. voltage level early in each cycle when the anode voltage is positive with respect to the cathode voltage,
   (e) a second resistor and the field winding connected in series across the terminals of said Zener diode to provide constant excitation of the field winding at the D.C. voltage level independently of the residual flux in said field,
   (f) a capacitor including means for charging said capacitor toward said D.C. voltage level at an adjustable time rate to provide a control voltage having a positive sloping time function, and
   (g) a circuit means for applying to said gate and cathode a voltage equal to the algebraic sum of the control voltage and the armature speed voltage.

2. A motor control system according to claim 1 wherein a diode is included in the series circuit containing the second resistor and the field winding to prevent the voltage drop across the field winding during conduction of said controlled rectifier from effecting modification of the charge on the capacitor.

References Cited by the Examiner
UNITED STATES PATENTS

| | | | |
|---|---|---|---|
| 3,165,688 | 1/1965 | Gutzwiller | 318—246 |
| 3,195,029 | 7/1965 | Gilbreath | 318—246 |
| 3,221,234 | 11/1965 | Ault | 318—250 |
| 3,237,073 | 2/1966 | Bartley et al. | 318—246 |

ORIS L. RADER, *Primary Examiner.*

B. DOBECK, *Assistant Examiner.*